(12) United States Patent
Konishi (10) Patent No.: US 8,391,621 B2
(45) Date of Patent: Mar. 5, 2013

(54) IMAGE PROCESSING DEVICE AND IMAGE REPRODUCING DEVICE

(75) Inventor: Tetsuya Konishi, Machida (JP)

(73) Assignee: Nikon Corporation, Tokyo (JP)

( * ) Notice: Subject to any disclaimer, the term of this patent is extended or adjusted under 35 U.S.C. 154(b) by 370 days.

(21) Appl. No.: 12/751,280

(22) Filed: Mar. 31, 2010

(65) Prior Publication Data

US 2010/0260430 A1  Oct. 14, 2010

(30) Foreign Application Priority Data

Apr. 1, 2009  (JP) .................................. 2009-089019

(51) Int. Cl.
*G06K 9/36* (2006.01)
(52) U.S. Cl. ....................................................... 382/232
(58) Field of Classification Search .......... 382/232–233, 382/312–313; 348/220.1–222.1, 229.1, 231.2, 348/296; 386/326, 328, 333; 396/213, 215
See application file for complete search history.

(56) References Cited

U.S. PATENT DOCUMENTS

| | | | | |
|---|---|---|---|---|
| 7,412,155 B2 * | 8/2008 | Kasai | ............................ | 386/248 |
| 7,526,144 B2 | 4/2009 | Maki et al. | | |
| 7,865,023 B2 * | 1/2011 | Takahashi | ..................... | 382/232 |
| 8,081,229 B2 * | 12/2011 | Ohta | .......................... | 348/222.1 |
| 8,125,535 B2 * | 2/2012 | Onoda et al. | ............... | 348/229.1 |

FOREIGN PATENT DOCUMENTS

| | | |
|---|---|---|
| JP | A-06-205360 | 7/1994 |
| JP | A-2001-045354 | 2/2001 |
| JP | A-2003-134514 | 5/2003 |
| JP | A-2003-250119 | 9/2003 |
| JP | A 2004-254101 | 9/2004 |

OTHER PUBLICATIONS

Dec. 13, 2011 Office Action issued in Japanese Patent Application No. 2009-089019 (with translation).
Office Action issued in Japanese Application No. 2009-089019 dated Jan. 4, 2011 (with translation).

* cited by examiner

*Primary Examiner* — Jose Couso
(74) *Attorney, Agent, or Firm* — Oliff & Berridge, PLC (57) ABSTRACT

An image processing device includes: an encoding unit that performs an encoding operation for encoding moving images; and a control unit that controls the encoding unit so as to perform the encoding operation on a plurality of still images that are captured in a continuous shooting mode.

8 Claims, 7 Drawing Sheets

IMAGE PROCESSING DEVICE AND IMAGE REPRODUCING DEVICE

INCORPORATION BY REFERENCE

The disclosure of the following priority application is herein incorporated by reference:

Japanese Patent Application No. 2009-089019 filed Apr. 1, 2009

BACKGROUND OF THE INVENTION

1. Field of the Invention

The present invention relates to an image processing device and an image reproducing device.

2. Description of Related Art

Japanese Laid-Open Patent Publication No. 2004-254101 discloses a technology of managing a plurality of still images as a single file. According to this technology, data that provides pointers to the respective pieces of still image data is described in a header portion of the image file, and the plurality of still images are reproduced according to the data.

In the prior art, image data representing a plurality of images is stored in a data region of the image file. Therefore, even if the data size of the header portion of the image file is reduced, there still is a problem that the size of the data region of the image file increases in proportion to the number of images stored in the image file.

SUMMARY OF THE INVENTION

An image processing device according to a first aspect of the present invention comprises: an encoding unit that performs an encoding operation for encoding moving images; and a control unit that controls the encoding unit so as to perform the encoding operation on a plurality of still images that are captured in a continuous shooting mode.

According to a second aspect of the present invention, in the image processing device according to the first aspect, it is preferable that the encoding unit associates control information corresponding to each of the plurality of still images to be subjected to the encoding operation, with data that has been subjected to the encoding operation.

According to a third aspect of the present invention, in the image processing device according to the first aspect, the control information may comprise information for generating at least one of commands for inhibiting the corresponding still image from being displayed, rotating the corresponding still image, and changing the sequence of said plurality of still images.

An image reproducing device according to a fourth aspect of the present invention comprises: a decoding unit that decodes encoded information obtained by performing an encoding operation for encoding moving images on a plurality of still images that are captured in a continuous shooting mode; and a still image generating unit that generates a plurality of still images based on the decoded information.

According to a fifth aspect of the present invention, the image reproducing device according to the fourth aspect may further comprise a display control unit that causes the plurality of still images to be arranged and displayed on a display device.

According to a sixth aspect of the present invention, in the image reproducing device according to the fifth aspect, it is preferable that the decoding unit acquires control information corresponding to each of the plurality of still images, along with the plurality of still images; and the display control unit performs at least one of an operation to inhibit the still image corresponding to the control information from being displayed, an operation to rotate the corresponding still image, and an operation to change the sequence of the plurality of still images corresponding to the control information.

According to a seventh aspect of the present invention, the image processing device according to the first aspect may further comprise a file generating unit that generates one moving image file into which the plurality of still images are encoded by the encoding unit.

DESCRIPTION OF PREFERRED EMBODIMENTS

An embodiment of the invention will be described with reference to the drawings.

<Image Reproducing Device>

Figure 1:
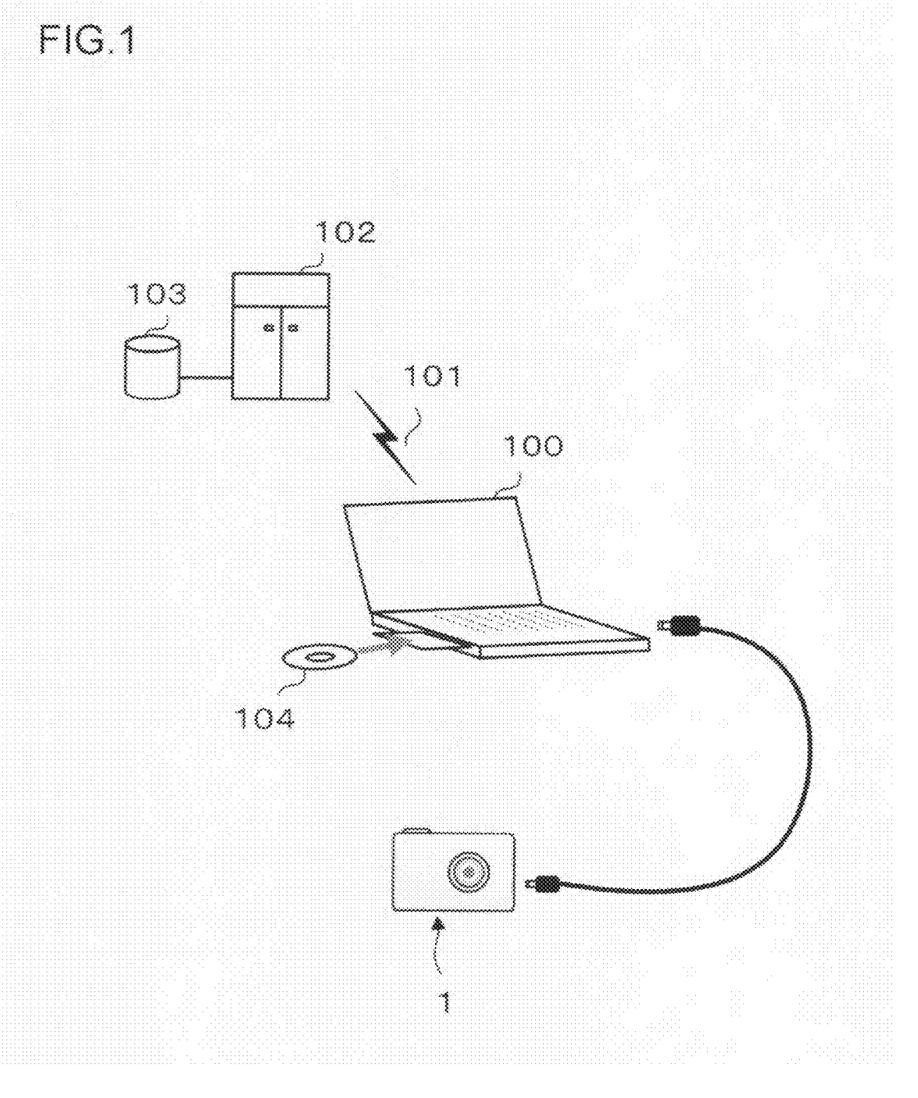
FIG. 1 is a view explaining an electronic camera system according to one embodiment of the invention.

FIG. 1 is a view explaining an electronic camera system according to one embodiment of the invention. The electronic camera system consists of an electronic camera 1 and a personal computer (which will be called "PC") 100. By loading a file reproduction program into the PC 100, and executing the program, the PC 100 is used as an image reproducing device. The loading of the program into the PC 100 may be implemented by setting a recording medium 104 that stores the program in the PC 100, or transmitting the program to the PC 100 via a communication line or network 101.

To transmit the program via the communication line 101, the program is stored in a hard disk drive 103, or the like, of a server (computer) 102 connected to the communication line 101. The file reproduction program may be supplied in various forms of computer program products, for example, may be provided through the recording medium 104 or the communication line 101. The PC 100 consists of a CPU and its peripheral circuit (see FIG. 7), and executes programs installed therein.

The PC 100 is configured to be able to communicate with the electronic camera 1. The communication between the electronic camera 1 and the PC 100 may be wire communication using a cable as shown in FIG. 1, or may be radio communication or wireless communication via radio terminals that are not illustrated.

<Electronic Camera>

The electronic camera 1 will be described in detail. The electronic camera 1 is arranged to be switchable between a photographing mode and a reproduction or playback mode. The photographing mode is an operating mode for capturing an image of a subject, and recording data of the captured image, as an image file, onto a recording medium (reference numeral 40 in FIG. 2) in the form of, for example, a memory card. In this embodiment, when a photo-shooting command continues to be generated, the electronic camera 1 operates in a continuous shooting mode in which subsequent pictures are continuously taken.

Figure 2:
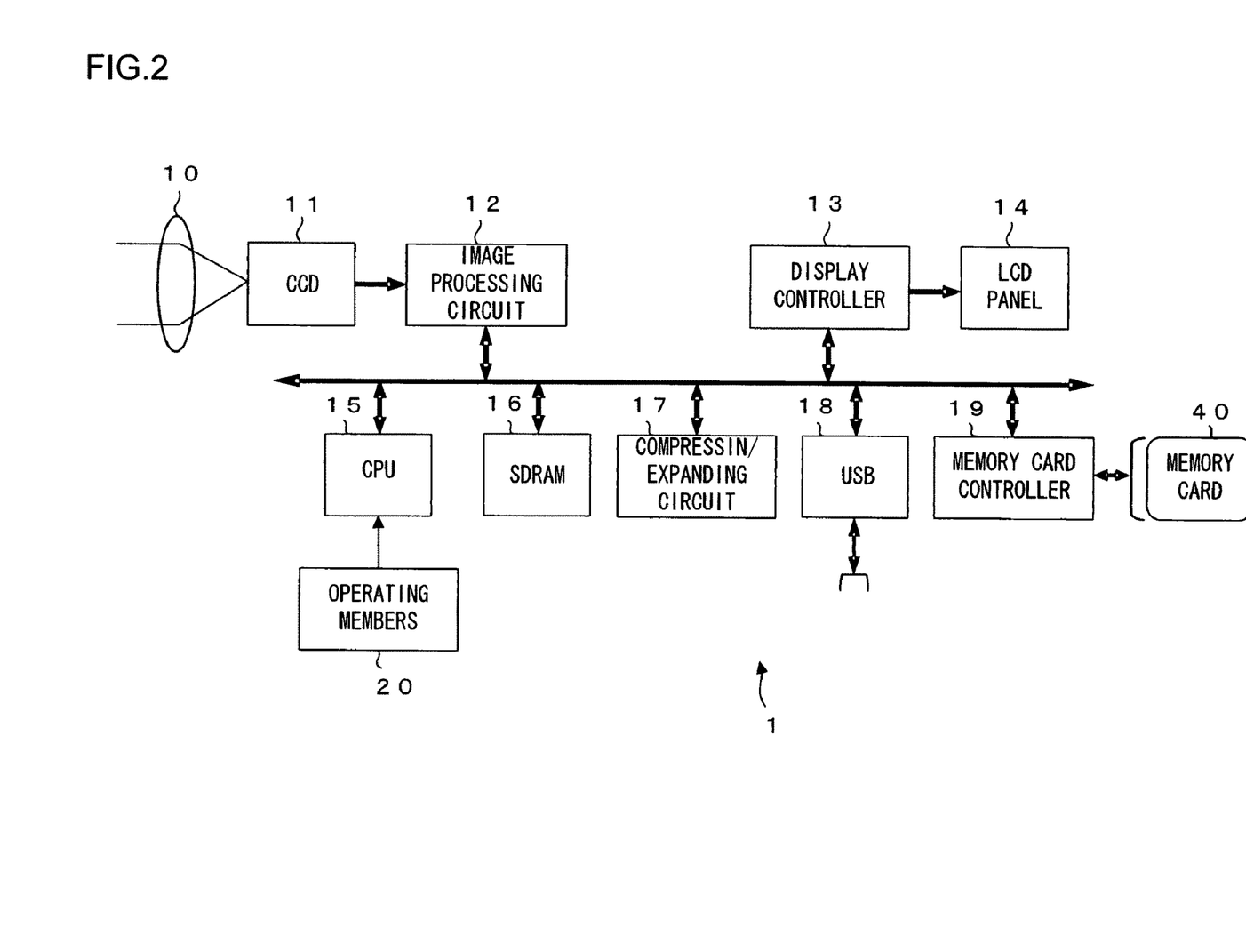
FIG. 2 is a block diagram explaining the construction of a principal part of an electronic camera.

The reproduction mode is a mode for reading data of a designated image file from the recording medium 40, and displaying a reproduced image or images represented by the image data, on an LCD panel (reference numeral 14 in FIG. 2).

This embodiment is characterized in data processing for generating an image file in which images captured in the continuous shooting mode are stored, and a process of reproducing the image file thus generated; therefore, these processes will be mainly explained below.

FIG. 2 is a block diagram explaining the construction of a principal part of the electronic camera 1. In FIG. 2, an image of a subject is formed on an imaging plane of an image pickup device 11 through a taking lens 10. The image pickup device 11 consists of, for example, a CCD image sensor or a CMOS image sensor. The image pickup device 11 performs photoelectric conversion on the subject image and generates an analog image signal.

The analog image signal is transmitted to an image processing circuit 12. The image processing circuit 12 performs analog signal processing, such as correlated double sampling and gain adjustment, on the analog image signal. The analog image signal that has been processed is converted into digital image data by an A/D conversion circuit (not shown). The image processing circuit 12 further performs predetermined image processing (such as color interpolation, tone conversion, edge enhancement, and white balance control) on the digital image data. In the case of continuous shooting, the image data that has been processed is subjected to MPEG compression by a compressing/expanding circuit 17, and is recorded into an SDRAM 16. In the case of normal single-frame shooting, on the other hand, the image data that has been processed is subjected to JPEG compression by the compressing/expanding circuit 17, and is recorded into the SDRAM 16. Data that yet to be or has been subjected to image processing and data currently under image processing are also temporarily recorded in the SDRAM 16.

In the case of continuous shooting, a CPU 15 reads MPEG compression code from the SDRAM 16, and records the code, along with certain accompanying information (metadata), onto the recording medium 40, as an image file (MPEG file), thereby to complete a photographing process. In the case of normal single-frame shooting, the CPU 15 reads JPEG compression code from the SDRAM 16, and records the code, along with certain accompanying information (metadata), onto the recording medium 40, as an image file (JPEG file), thereby to complete a photographing process.

The recording medium 40 can be inserted into and removed from the electronic camera 1 as desired. The CPU 15 records data onto the recording medium 40 and reads data recorded on the recording medium 40, via a memory card controller 19.

When operating in the reproduction mode, the CPU 15 reads an image file recorded on the recording medium 40, and causes the compressing/expanding circuit 17 to perform an expanding operation on the image file. Further, the CPU 15 causes the image processing circuit 12 to perform resolution conversion for converting the image data to an appropriate size, and temporarily records the resulting data in the SDRAM 16. A display controller 13 reads image data from the SDRAM 16 according to a command from the CPU 15, and generates data for display, based on the image data. The LCD panel 14 provided on the back of the electronic camera 1 displays a reproduced image or images represented by the data for display. In this connection, a reproduction process based on the image file generated in the case of continuous shooting, i.e., the image file containing MPEG compression code, will be described in detail later.

In the photographing mode, the CPU 15 operates the LCD panel 14 as a viewfinder. By using data for display produced without compressing digital image data, a monitor image (live view image) of a subject is displayed on the LCD panel 14.

A USB controller 18 conducts certain communications with external equipment (e.g., PC 100). The electronic camera 1 transfers image files to the external equipment via the USB controller 18. Transferring of image files includes copying and moving of the image files.

The CPU 15 controls the operation of the electronic camera 1, by executing programs stored in a nonvolatile memory (not shown) incorporated therein. The CPU 15 receives signals generated from respective blocks, performs certain operations or computations, and outputs control signals based on the computation results, to the respective blocks.

Operating members 20 include a half-press switch and a full-press switch, which are placed in the ON/OFF position in accordance with an operation to press down a release button (not shown), a menu switch, and so forth. Each of the operating members 20 sends an operation signal representing each operation or manipulation, to the CPU 15.

In the following, a process of generating an MPEG image file in the case of continuous shooting will be described in detail.

<Generation of Image File>

Figure 3:
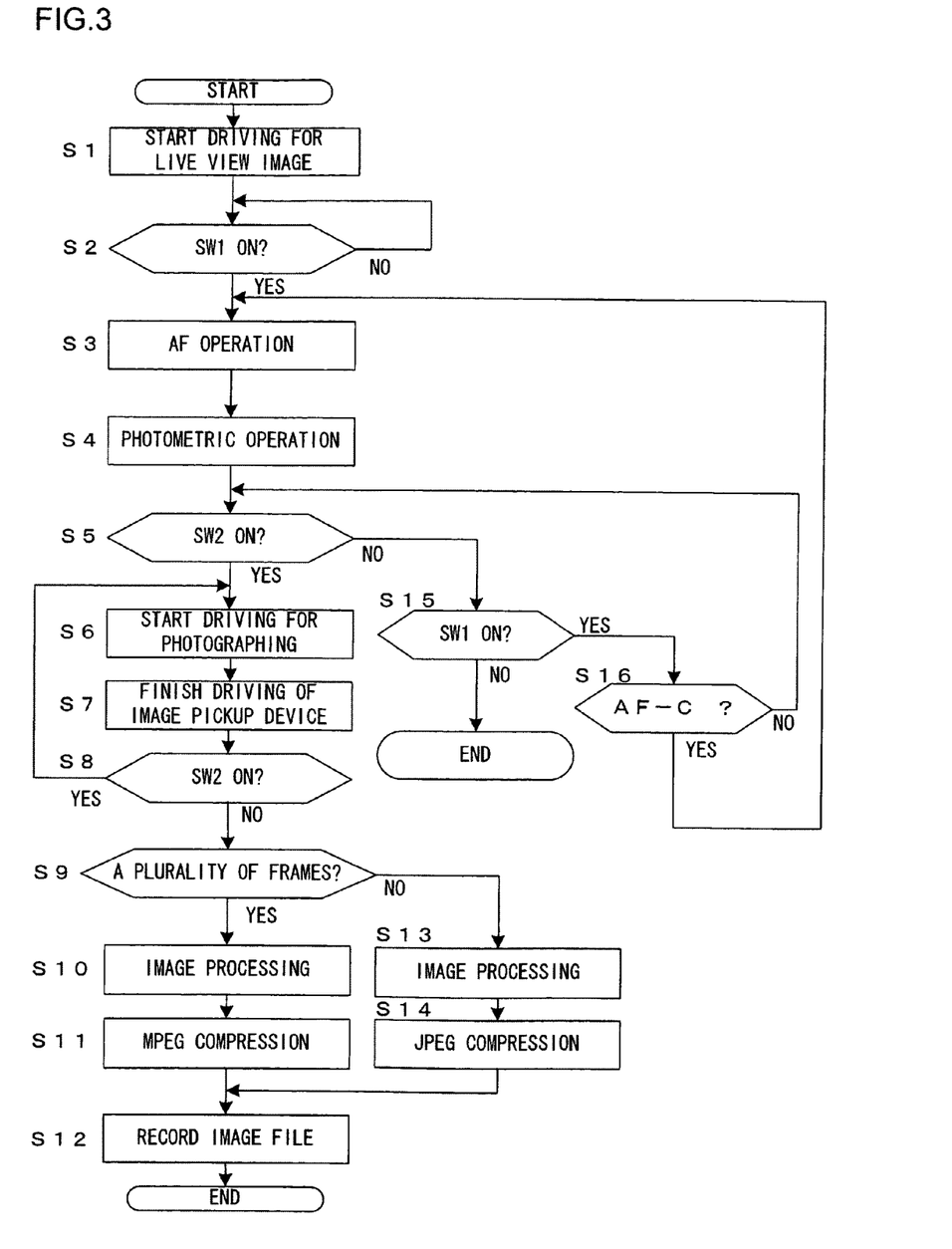
FIG. 3 is a flowchart explaining the flow of a process executed in a photographing mode.

The CPU 15 of the electronic camera 1 switches its operating mode to the photographing mode when switching to the photographing mode is instructed by an operation signal from the operating members 20, and repeatedly carries out a process as illustrated in FIG. 3. FIG. 3 is a flowchart explaining the flow of the process executed in the photographing mode. In step S1 of FIG. 3, the CPU 15 starts driving control for live view imaging on the image pickup device 11, and proceeds to step S2. As a result, the image pickup device 11 starts acquiring live view image data. Live view images mean monitor images (images that appear on the monitor) captured before a shooting command is generated. The CPU 15 is configured to repeatedly capture a live view image and display the live view image on the LCD panel 14, until a half-press switch SW1 which will be described later is operated to the ON position.

In step S2, the CPU 15 determines whether the half-press switch SW1 is placed in the ON position. The half-press switch SW1, which constitutes the operating members 20, outputs an ON signal to the CPU 15 in accordance with an operation to press down a release button (not shown). The half-press switch SW1 generates a half-press operation signal when the release button is pressed halfway down to about a half of the normal stroke, and ceases to generate the half-press operation signal when the operation to press the release button halfway down is terminated. When the CPU 15 receives the half-press operation signal from the half-press switch SW1, it makes an affirmative decision in step S2, and proceeds to step S3. When the CPU 15 receives no half-press operation signal from the half-press switch SW1, it makes a negative decision in step S2, and repeats the determining operation.

The CPU 15 performs a predetermined AF (autofocusing) operation in step S3, and proceeds to step S4. The CPU 15 performs a photometric operation in step S4, and proceeds to step S5. The photometric operation is to calculate a shutter speed and an aperture value, based on an image signal obtained by the image pickup device 11.

In step S5, the CPU 15 determines whether the full-press switch SW2 is placed in the ON position. The full-press switch SW2, which constitutes the operating members 20, outputs an ON signal to the CPU 15 in accordance with an operation to press down the release button (not shown). The full-press switch SW2 generates a full-press operation signal when the release button is fully pressed down to its normal stroke, and ceases to generate the full-press operation signal when the operation to press the release button down to its normal stroke is terminated. When the CPU 15 receives the full-press operation signal from the full-press switch SW2, it makes an affirmative decision in step S5, and proceeds to step S6. When the CPU 15 receives no full-press operation signal from the full-press switch SW2, it makes a negative decision in step S5, and proceeds to step S15.

In step S15, the CPU 15 determines whether the half-press switch SW1 is in the ON position. If the CPU 15 keeps receiving the half-press operation signal from the half-press switch SW1, it makes an affirmative decision in step S15, and proceeds to step S16. If the CPU 15 does not receive the half-press operation signal from the half-press switch SW1, it makes a negative decision in step S15, and completes the process of FIG. 3.

In step S16, the CPU 15 determines an AF-servo setting content. When an AF-C mode is set as the AF servo, the CPU 15 makes an affirmative decision in step S16, and returns to step S3. The AF-C mode is a mode in which the AF (autofocusing) operation is repeatedly performed. If an AF-S mode is set as the AF servo, the CPU 15 makes a negative decision in step S16, and returns to step S5. The AF-S mode is an AF lock mode in which only one AF (autofocusing) operation is performed, and the resulting focus status is maintained. The selection of the AF servo is made in advance through the operation of the operating members 20 by the user.

The CPU 15 proceeds to step S6 when it makes an affirmative decision in step S5 as described above. In step S6, the CPU 15 starts driving control for photographing on the image pickup device 11, and proceeds to step S7. In step S7, the CPU 15 finishes driving control on the image pickup device 11 when the data accumulation time of the image pickup device 11 reaches the time corresponding to the shutter speed. Then, the CPU 15 proceeds to step S8. The acquired image data is stored in the SDRAM 16.

In step S8, the CPU 15 determines whether the full-press switch SW2 is in the ON position. When the CPU 15 keeps receiving the full-press operation signal from the full-press switch SW2, it makes an affirmative decision in step S8, and returns to step S6. In this case, the image capturing operation is repeated (continuous shooting). When the CPU 15 does not receive the full-press operation signal from the full-press switch SW2, it makes a negative decision in step S8, and proceeds to step S9.

In step S9, the CPU 15 determines whether digital image data corresponding to a plurality of frames is stored in the SDRAM 16. If data corresponding to a plurality of frames is present in the SDRAM 16, the CPU 15 makes an affirmative decision in step S9, and proceeds to step S10. If data corresponding to a plurality of frames is not present, the CPU 15 makes a negative decision in step S9, and proceeds to step S13.

In step S10, the CPU 15 causes the image processing circuit 12 to perform predetermined image processing on the image data stored in the SDRAM 16, and proceeds to step S11. The image processing circuit 12 performs predetermined image processing (such as color interpolation, tone conversion, edge enhancement, and white balance control), on each item of the image data stored in the SDRAM 16.

In step S11 to be executed after the image processing, the CPU 15 causes the compressing/expanding circuit 17 to perform an MPEG compressing operation on the plural frames of image data, and proceeds to step S12. The compressing/expanding circuit 17 performs the MPEG compressing operation, using the image data that has been subjected to image processing and is stored in the SDRAM 16. More specifically, all of the pictures (frames) taken in the continuous shooting mode constitute a GOP (Group Of Pictures), and are compressed, designating the first or leading one of the frames obtained by continuous shooting as an I (Intra Picture) frame.

In step S12 to be executed after the image compression, the CPU generates an image file, and records the image file onto the recording medium 40, thereby to complete the process of FIG. 3.

If the CPU 15 makes a negative decision in step S9, it proceeds to step S13. In step S13, the CPU 15 causes the image processing circuit 12 to perform predetermined image processing on image data corresponding to one frame and stored in the SDRAM 16, and proceeds to step S14. The image processing circuit 12 performs predetermined image processing (such as color interpolation, tone conversion, edge enhancement, and white balance control) on the image data stored in the SDRAM 16.

In step S14 to be executed after the image processing, the CPU 15 causes the compressing/expanding circuit 17 to perform a JPEG compressing operation on the image data, and proceeds to step S12. The compressing/expanding circuit 17 performs JPEG compression on the image data that has been subjected to image processing and is stored in the SDRAM 16.

Next, the reproduction process based on the MPEG image file generated in the case of continuous shooting will be described in detail.

<Control Information Entering Process>

The PC 100 into which a reproduction program is loaded operates as an image reproducing device when executing the file reproduction program. The file reproduction is implemented by arranging thumbnail images of continuously shot frames and displaying a list of the thumbnail images on a monitor of the PC 100, based on the above-mentioned MPEG image file. A control information entering process is a process of receiving control information for, for example, deleting a given frame, which is selected from the frames displayed in list form, or rotating a given frame so as to flip it vertically and displaying the rotated frame, or changing the order in which the frames are displayed in list form.

Figure 7:
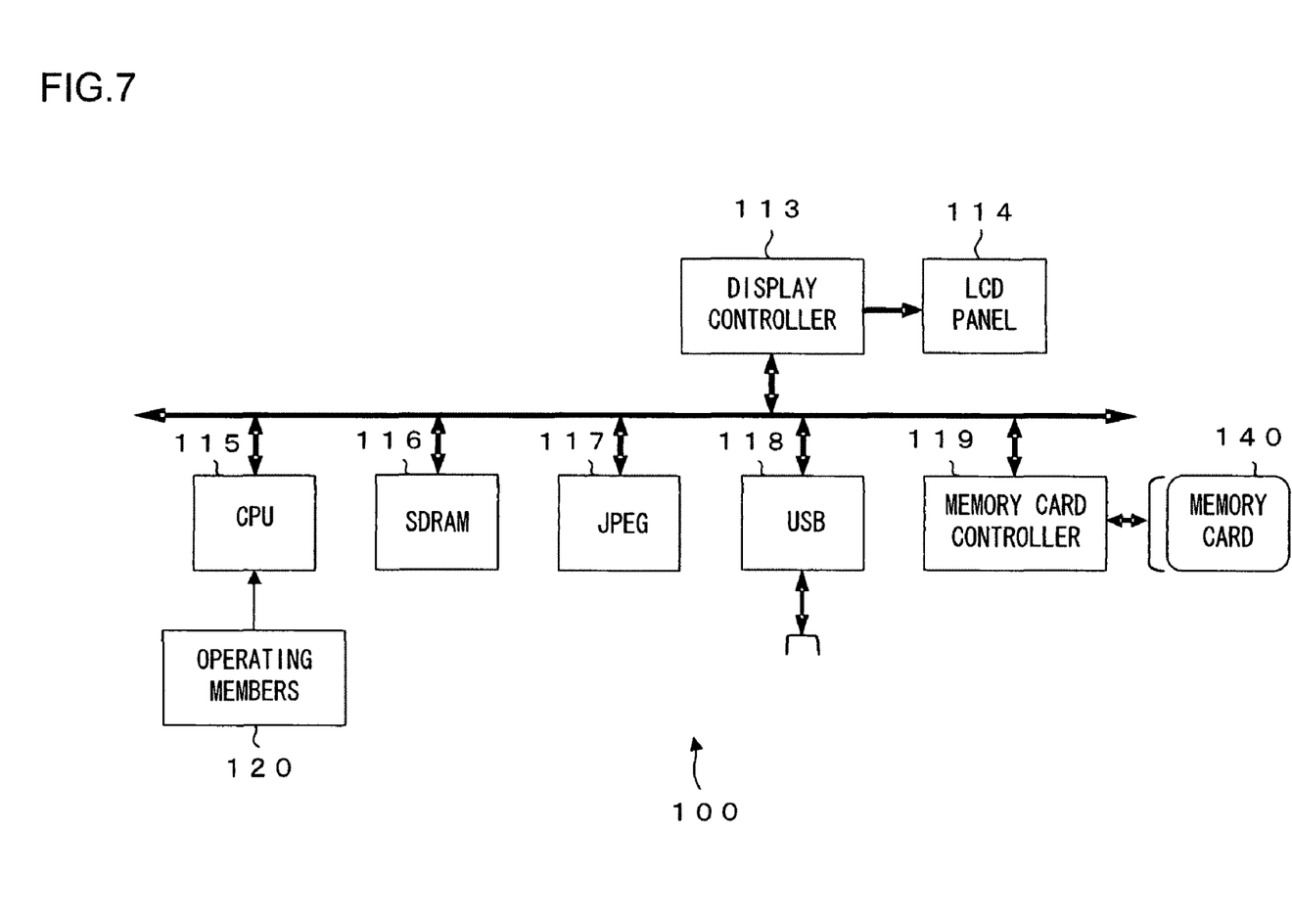
FIG. 7 is a block diagram explaining the construction of a principal part of a PC.

FIG. 7 is a block diagram explaining the construction of a principal part of the PC 100. The PC 100 mainly includes a display controller 113, LCD panel (monitor) 114, CPU 115, SDRAM 116, compressing/expanding circuit 117, USB controller 118, memory card controller 119, operating members (such as a keyboard and a mouse) 120, and so forth. A recording medium 140 may be inserted into and removed from the PC 100 as desired.

Figure 4:
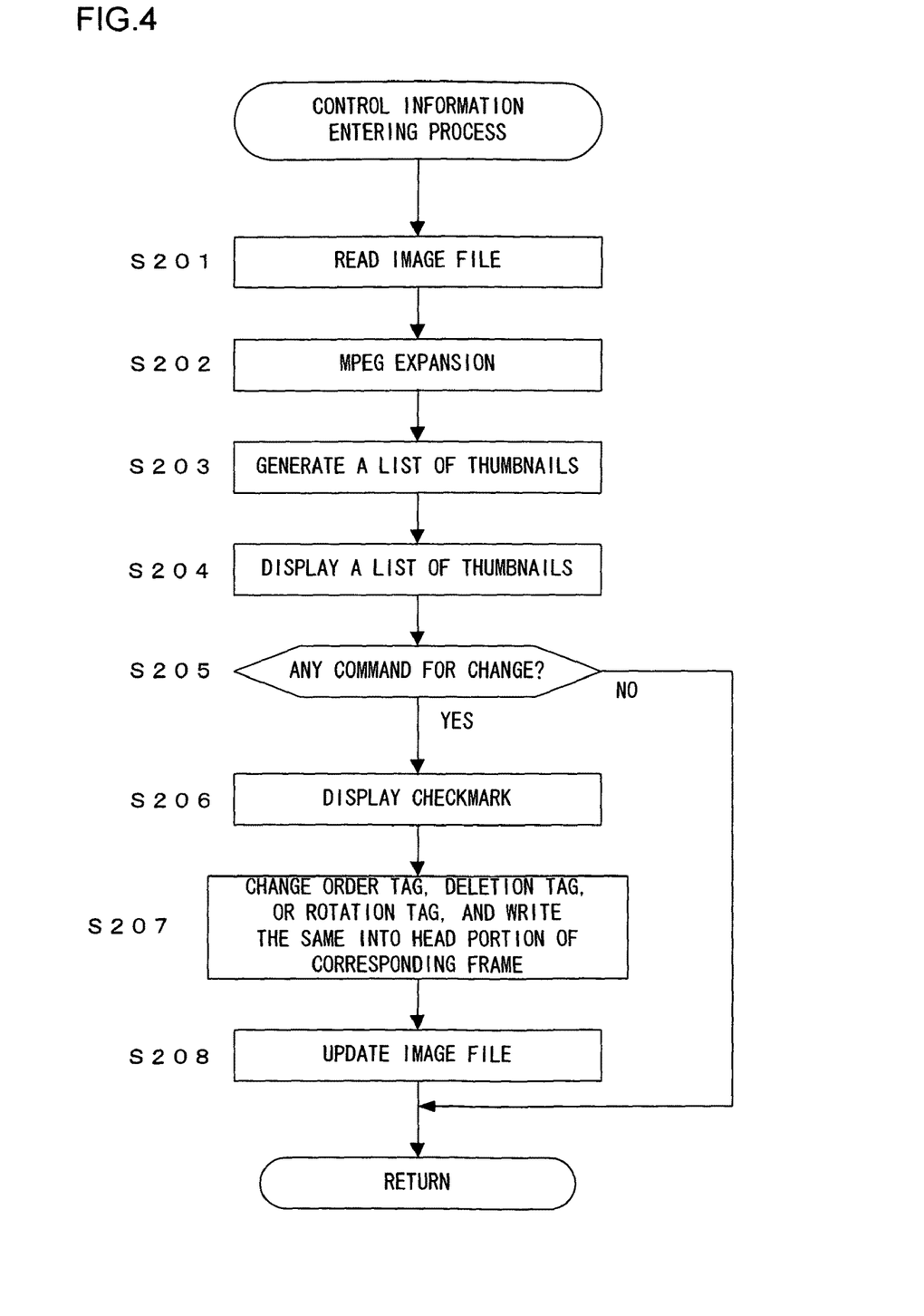
FIG. 4 is a flowchart explaining the flow of a control information entering process.

When the PC 100 that has started running the reproduction program receives a control information entry command via an operation signal from, for example, a keyboard, it executes the control information entering process. FIG. 4 is a flowchart explaining the flow of the control information entering process performed by the CPU 115 of the PC 100. In step S201 of FIG. 4, the CPU 115 reads an MPEG image file recorded within the storage device of the PC 100 or on the recording medium 140, and proceeds to step S202.

In step S202, the CPU 115 causes the compressing/expanding circuit 117 to perform an MPEG expanding operation on the image file, and proceeds to step S203. As a result, the compressing/expanding circuit 117 performs a decoding operation on the MPEG image file stored in the SDRAM 116.

In step S203, the CPU 115 generates thumbnail images corresponding to all of the frames that constitute GOP, in the SDRAM 116, based on the result of the decoding operation, and proceeds to step S204. The CPU 115 may generate thumbnail images in the same data size as the images obtained by the decoding operation, or may generate thumbnail images by re-sizing the images into a smaller data size according to the resolution of the monitor 114. In step S204, the CPU 115 causes the thumbnail images generated in the SDRAM 116 to be arranged and displayed in list form on the monitor 114 of the PC 100, and proceeds to step S205.

Figure 5:
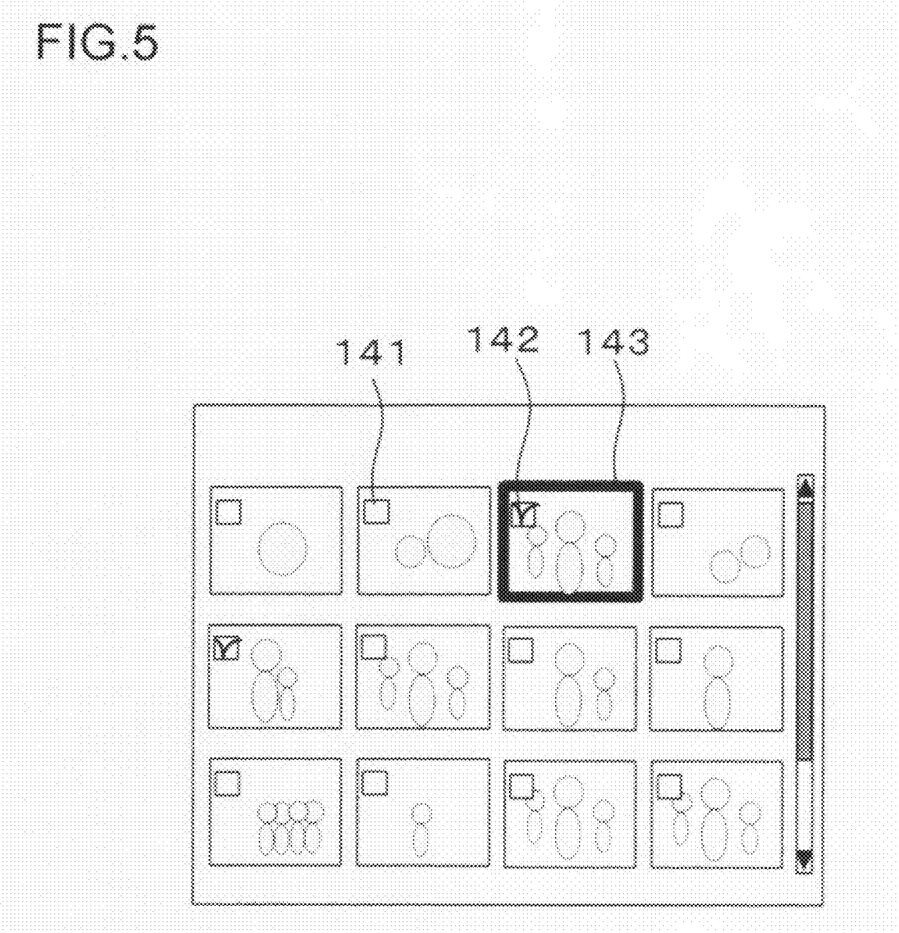
FIG. 5 is a view showing an example of list displayed on a monitor screen.

FIG. 5 is a view showing an example of list display on the monitor screen. When 20 frames are taken as continuously shot frames, thumbnail images for 20 frames are displayed. If the images cannot be displayed at a time on the monitor screen, display scrolling is used to display all of the images. In FIG. 5, the CPU 115 provides a display of a checkbox 141 in correspondence with each of the thumbnail images. The CPU 115 further provides a display of a cursor 143 surrounding one of the thumbnail images. When an arrow key pointing in a vertical direction on the keyboard is pressed down, the CPU 115 moves the display position of the cursor 143 in the vertical direction. When an arrow key pointing in a lateral direction is pressed down, the CPU 115 moves the display position of the cursor 143 in the lateral direction.

In step S205, the CPU 115 determines whether a command to change control information is generated. If the Enter key is pressed down in a condition where no checkmark 142 appears in the checkbox 141 surrounded by the cursor 143, the CPU 115 places a checkmark 142 for display in the checkbox 141. If the Enter key is pressed down in a condition where a checkmark 142 appears in the checkbox 141 surrounded by the cursor 143, the CPU 115 deletes the checkmark 142 in the checkbox 141. The CPU 115 sets frames corresponding to the thumbnail images for which the checkmarks 142 are displayed on the thumbnail list display screen, as frames to be subjected to display control.

When an operation to add or delete the checkmark 142 is performed, the CPU 115 makes an affirmative decision in step S205, and proceeds to step S206. When no operation to add or delete the checkmark 142 is performed, the CPU 115 makes a negative decision in step S205, and completes the process of FIG. 4.

In step S206, the CPU 115 places a checkmark 142 for display in the checkbox 141 according to an adding operation, and proceeds to step S207. The display control content can be individually set for each of the frames to be subjected to display control, in which the checkmarks 142 are placed or displayed in the checkboxes 141. In step S207, the CPU 115 changes order tags, or a deletion tag, or a rotation tag, according to an operation signal from the keyboard.

The order tags are changed in the following manner. For example, when the images are displayed in list form in the same order as that in which the frames that constitute the GOP are arranged, the order tags for the respective frames are set to 1, 2, 3, 4, 5, 6, . . . . When the display control content is set so that the image of the fifth frame is moved to the head of the list, the order tags are set to 2, 3, 4, 5, 1, 6, . . . .

The deletion tag is changed in the following manner. For example, a frame to be deleted is designated in the arrangement of the frames that constitute the GOP. More specifically, when all of the frames are displayed in list form, the deletion tags for the respective frames are set to 0, 0, 0, 0, 0, 0, . . . . When the display control content is set so as to delete the image of the fourth frame, the deletion tags are set to 0, 0, 0, 1, 0, 0, . . . .

The rotation tag is changed in the following manner. For example, the rotational angle of a frame to be rotated is designated in the arrangement of the frames that constitute the GOP. More specifically, when all of the frames are displayed without being rotated, the rotation tags for the respective frames are set to 0, 0, 0, 0, 0, 0, . . . . When the display control content is set so as to rotate the image of the third frame by 90 degrees, the rotation tags are set to 0, 0, 90, 0, 0, 0, . . . .

Generally, a header portion is provided for each frame in the MPEG file; therefore, when a certain tag is changed, the CPU writes the changed tag information into the header portion of the corresponding frame. In step S208, the CPU 115 writes the MPEG image file into which the tag information is written, into the storage device of the PC 100 or onto the recording medium 140, over the existing file for updating, and then completes the process of FIG. 4.

<Reproducing Process>

Figure 6:
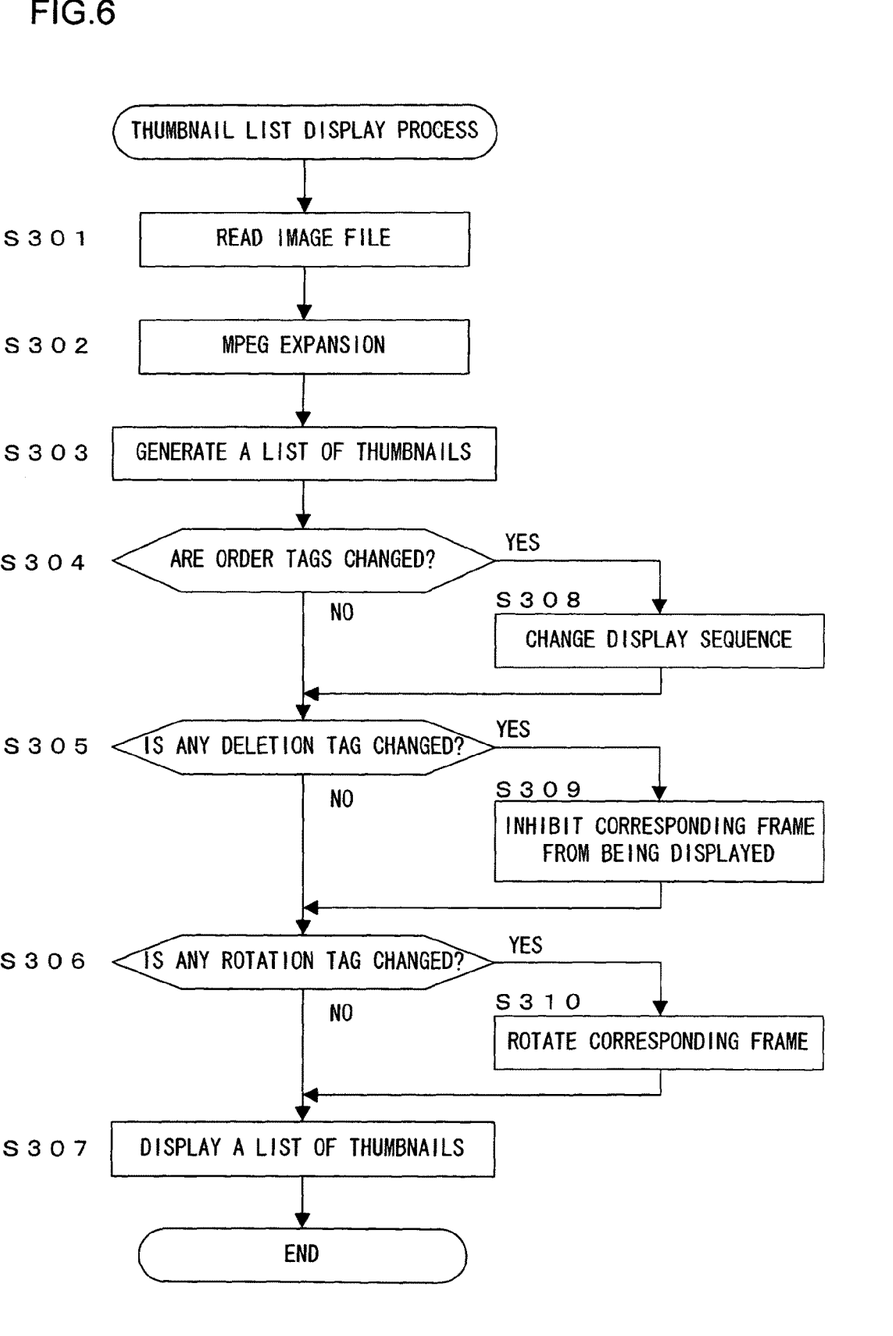
FIG. 6 is a flowchart explaining the flow of a thumbnail list display process.

When the PC 100 that has started running the reproduction program receives a reproduction display command via an operation signal from, for example, the keyboard, it executes a thumbnail list display process. FIG. 6 is a flowchart explaining the flow of the thumbnail list display process performed by the CPU 115 of the PC 100. In step S301 of FIG. 6, the CPU 115 reads an MPEG image file recorded in the storage device of the PC 100 or on the recording medium 140, and proceeds to step S302.

The CPU 115 causes the compressing/expanding circuit 117 to perform an MPEG expanding operation on the image file in step S302, and proceeds to step S303. The compressing/expanding circuit 117 performs a decoding operation on the MPEG image file stored in the SDRAM 116. In step S303, the CPU 115 generates thumbnail images corresponding to all of the frames that constitute the GOP, in the SDRAM 116, based on the result of the decoding operation. Then, the CPU 115 proceeds to step S304.

In step S304, the CPU 115 determines whether the order tags are changed. The CPU 115 checks tag information corresponding to each frame. If the order tags are changed, the CPU 115 makes an affirmative decision in step S304, and proceeds to step S308. If the order tags are not changed, the CPU 115 makes a negative decision in step S304, and proceeds to step S305.

In step S308, the CPU 115 rearranges the thumbnail images generated in the SDRAM 116, namely, arranges the thumbnail images in a different sequence, based on the order tags, and proceeds to step S305. The rearrangement is effected with respect to the thumbnail images in the SDRAM 116, but does not make any change to the MPEG image file.

In step S305, the CPU 115 determines whether any of the deletion tags is changed. The CPU 115 checks tag information corresponding to each frame. If any of the deletion tags is changed, the CPU 115 makes an affirmative decision in step S305, and proceeds to step S309. If none of the deletion tag is changed, the CPU 115 makes a negative decision in step S305, and proceeds to step S306.

In step S309, the CPU 115 deletes the corresponding thumbnail image or images, from the thumbnail images generated in the SDRAM 116, based on the deletion tags, and proceeds to step S306. The deleted thumbnail image or images are excluded from (or not displayed in) the list displayed in step S307 which will be described later. The deletion is effected with respect to the thumbnail images in the SDRAM 116, but does not make any change to the MPEG image file.

In step S306, the CPU 115 determines whether any of the rotation tags is changed. The CPU 115 checks tag information corresponding to each frame. If any of the rotation tags is changed, the CPU 115 makes an affirmative decision in step S306, and proceeds to step S310. If none of the rotation tags is changed, the CPU 115 makes a negative decision in step S306, and proceeds to step S307.

In step S310, the CPU 115 rotates the corresponding thumbnail image or images, out of the thumbnail images generated in the SDRAM 116, based on the rotation tags, and proceeds to step S307. The rotation is effected with respect to the thumbnail images in the SDRAM 116, but does not make any change to the MPEG image file.

In step S307, the CPU 115 arranges the thumbnail images generated in the SDRAM 116, and displays a list of the thumbnail images on the monitor 114 of the PC 100. Then, the CPU 115 completes the process of FIG. 6.

The CPU 115 generates a still image corresponding to a thumbnail image selected from the thumbnail images displayed in list form on the monitor 114 of the PC 100. When a command for conversion into a still image is entered by a keyboard operation while a list of the thumbnail images similar to that of FIG. 5 is displayed, the CPU 115 newly generates a still image file corresponding to the thumbnail image surrounded by the cursor 143. For example, a JPEG image file is created by performing JPEG compression on the image of the data size obtained by the decoding operation. The JPEG image file is given a certain name and recorded in a certain region within the storage device of the PC 100 or the recording medium 140.

Also, when a command for recording a list of thumbnails is entered by a keyboard operation while the list of thumbnail images is displayed on the monitor 114 of the PC 100, the CPU 115 newly generates a still image file in which data of all of the thumbnail images displayed in list form is stored. The image file containing the group of thumbnail images is given a certain name and recorded in a certain region within the storage device of the PC 100 or the recording medium 140.

Modified Example 1

When the ratio of the number of the thumbnail images set as objects to be deleted with the deletion tags, to the number of frames that constitute the GOP reaches a specified value, the image data may be encoded again to generate an MPEG image file.

Modified Example 2

In the above description, information for rearranging the frames, deleting a particular frame or frames (inhibiting the frame(s) from being displayed), or rotating a particular frame or frames, is entered through the control information entering process. In addition, information for increasing the display brightness of a particular frame or frames, or varying tints or tones of display colors, or varying tone or gradation characteristics may be entered. In this case, the CPU controls the display characteristics of the corresponding thumbnail image(s), out of the thumbnail images generated in the SDRAM 16.

Modified Example 3

While the PC 100 carries out the control information entering process and the reproducing process in the illustrated embodiment and examples, these processes may be performed by the electronic camera 1.

The embodiment as described above provides the following effects.

(1) The electronic camera 1 includes the compressing/expanding circuit 17 that performs an encoding operation for encoding moving images, and the CPU 15 that controls the compressing/expanding circuit 17 so as to perform the encoding operation on a plurality of still images captured in a continuous shooting mode. By compressing a plurality of still images captured in the continuous shooting mode into a single moving image file, it is possible to reduce the file size, as compared with the case where the plurality of still images are recorded as a plurality of still image files.

Since the images are continuously captured at close shooting times, there is a high correlation between the frames (images). It is thus possible to reduce the file size while suppressing image degradation, as compared with the case where a group of images having a low correlation between the frames is subjected to an encoding operation for moving images.

(2) The compressing/expanding circuit 17 associates control information corresponding to each of the plurality of still images to be encoded, with data that has been subjected to encoding. With this arrangement, when the images are reproduced based on the encoded file, specified control can be performed on each of the images corresponding to the frames that constitute the GOP.

(3) The control information is information for generating at least one of commands for inhibiting the corresponding still image from being displayed, rotating the corresponding still image, and changing the sequence of the plurality of still images. In this case, when the images are reproduced based on the encoded file, each of the images corresponding to the frames that constitute the GOP can be processed as instructed to be inhibited from being displayed, or rotated, or changed in the order of appearance.

(4) The electronic camera 1 includes the compressing/expanding circuit 17 for decoding the encoded information obtained by performing an encoding operation for encoding moving images, on a plurality of still images captured in a continuous shooting mode, and the CPU 15 that generates a plurality of still images based on the decoded information. Also, the PC 100 includes the compressing/expanding circuit 117 for decoding the encoded information obtained by performing an encoding operation for encoding moving images, on a plurality of still images captured in a continuous shooting mode, and the CPU 115 that generates a plurality of still images based on the decoded information. For example, a list of thumbnail images corresponding to the frames that constitutes the GOP of the encoded file is generated, so that the images of the individual frames can be viewed as if they are independent of each other.

(5) The plurality of still images are arranged and displayed by a display means. For example, a list of thumbnail images is displayed, so that the images of the individual frames can be viewed as if they are independent of each other.

(6) The compressing/expanding circuit 17, 117 acquires control information corresponding to each of a plurality of still images, along with the plurality of still images, and the CPU 15, 115 performs at least one of operations to inhibit the still image corresponding to the control information from being displayed, rotate the corresponding still image, and change the sequence of the plurality of still images corresponding to the control information. With this arrangement, when a list of thumbnail images is displayed, the frames that constitute the GOP may be rearranged, or a particular frame or frames may be deleted (inhibited from being displayed), or a particular frame or frames may be rotated, so that the images of the individual frames can be treated as if they are independent of each other. Even with the above change(s) thus made, the file size of the file subjected to encoding for moving images will not increase. Also, the changes made to the still images do not result in any change to the encoded file; therefore, if the original control information is resumed, the initial thumbnail list display can be resumed in which the thumbnail images are arranged in the same order in which the frames that constitute the GOP are arranged, and none of the thumbnail images is deleted nor rotated.

According to the embodiment of the invention as described above, the data size of the still images captured in the continuous shooting mode can be reduced.

The above-described embodiments are examples, and various modifications can be made without departing from the scope of the invention.

What is claimed is:

1. An image processing device comprising:
   an encoding unit that performs an encoding operation for encoding moving images; and
   a control unit that controls the encoding unit so as to perform the encoding operation on a plurality of still images that are captured in a continuous shooting mode, the encoding operation being performed by compressing the plurality of still images into a single moving image file.

2. The image processing device according to claim 1, wherein:
   the encoding unit associates control information corresponding to each of the plurality of still images to be subjected to the encoding operation, with data that has been subjected to the encoding operation.

3. The image processing device according to claim 1, wherein:
   the control information comprises information for generating at least one of commands for inhibiting the corresponding still image from being displayed, rotating the corresponding still image, and changing the sequence of said plurality of still images.

4. An image reproducing device comprising:
   a decoding unit that decodes encoded information on a plurality of still images, the encoded information being obtained by performing an encoding operation for encoding moving images on athe plurality of still images that are captured in a continuous shooting mode, the encoded information on the plurality of still images being made into a single image file; and
   a still image generating unit that generates a plurality of still images based on the decoded information.

5. The image reproducing device according to claim 4, further comprising:
   a display control unit that causes the plurality of still images to be arranged and displayed on a display device.

6. The image reproducing device according to claim 5, wherein:
   the decoding unit acquires control information corresponding to each of the plurality of still images, along with the plurality of still images; and
   the display control unit performs at least one of an operation to inhibit the still image corresponding to the control information from being displayed, an operation to rotate the corresponding still image, and an operation to change the sequence of the plurality of still images corresponding to the control information.

7. The image processing device according to claim 1, further comprising:
   a file generating unit that generates one moving image file into which the plurality of still images are encoded by the encoding unit.

8. The image reproducing device according to claim 4, further comprising:
   a still image generating unit that generates a plurality of still images based on the decoded information, the generation of the plurality of still images being performed by making the plurality of still images as a single frame.

* * * * *